United States Patent [19]

Spirig

[11] Patent Number: 5,688,199
[45] Date of Patent: Nov. 18, 1997

[54] VARIABLE RATIO DRIVE MECHANISM

[76] Inventor: Ernest Spirig, P.O. Box 1140, CH-8640 Rapperswil, Switzerland

[21] Appl. No.: 525,605

[22] PCT Filed: Jan. 25, 1995

[86] PCT No.: PCT/EP95/00045

§ 371 Date: Sep. 11, 1995

§ 102(e) Date: Sep. 11, 1995

[87] PCT Pub. No.: WO95/18931

PCT Pub. Date: Jul. 13, 1995

[30] Foreign Application Priority Data

Jan. 11, 1994 [GB] United Kingdom .................. 9400416

[51] Int. Cl.$^6$ ........................................ F16H 9/10
[52] U.S. Cl. ................................. 474/49.1; 474/52
[58] Field of Search ................. 474/47, 49, 50, 474/52, 70

[56] References Cited

U.S. PATENT DOCUMENTS

| | | |
|---|---|---|
| 2,584,447 | 2/1952 | Hayot . |
| 3,605,512 | 9/1971 | Wetzel, II . |
| 3,935,751 | 2/1976 | Lee .............................. 474/50 |
| 4,498,351 | 2/1985 | Ahoor ......................... 474/47 X |
| 4,516,960 | 5/1985 | Rathert ....................... 474/47 X |
| 4,608,034 | 8/1986 | Reswick . |
| 5,407,395 | 4/1995 | Kramer ........................ 474/49 |

FOREIGN PATENT DOCUMENTS

| | | |
|---|---|---|
| 751678 | 11/1970 | Belgium . |
| 327556 | 6/1903 | France . |
| 486957 | 5/1918 | France . |
| 93896 | 9/1897 | Germany . |
| 270021 | 2/1913 | Germany . |
| 498008 | 5/1930 | Germany . |
| 523312 | 4/1931 | Germany . |

*Primary Examiner*—Roger J. Schoeppel
*Attorney, Agent, or Firm*—Harness, Dickey & Pierce, P.L.C.

[57] ABSTRACT

A variable ratio drive mechanism, suitable for a bicycle for example, has at least one gear whose effective radius is variable in a stepless manner in response to applied torque and/or in response to an external force. The gear may include a helical spring (10) which is "wound up" as torque is applied, to decrease its radius. Other possibilities include a rim (20) supported by spokes in the form of compressible springs (22), or a series of outwardly biased arcuate members (30) arranged around a central hub.

19 Claims, 5 Drawing Sheets

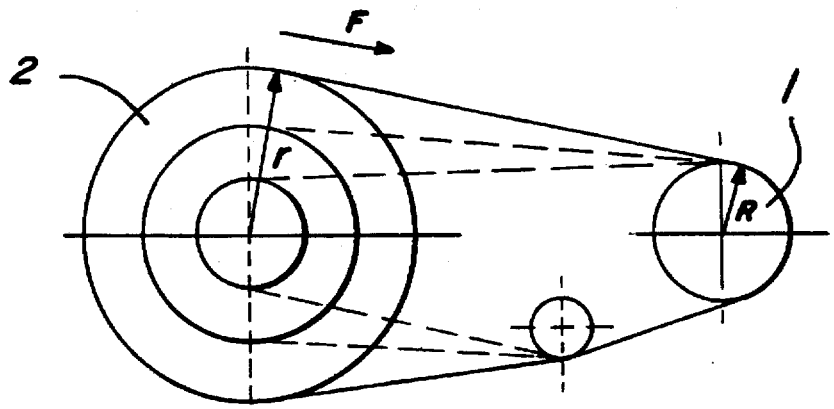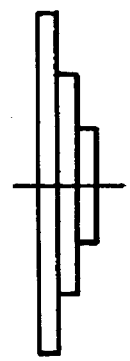
Fig-1a  Fig-1b
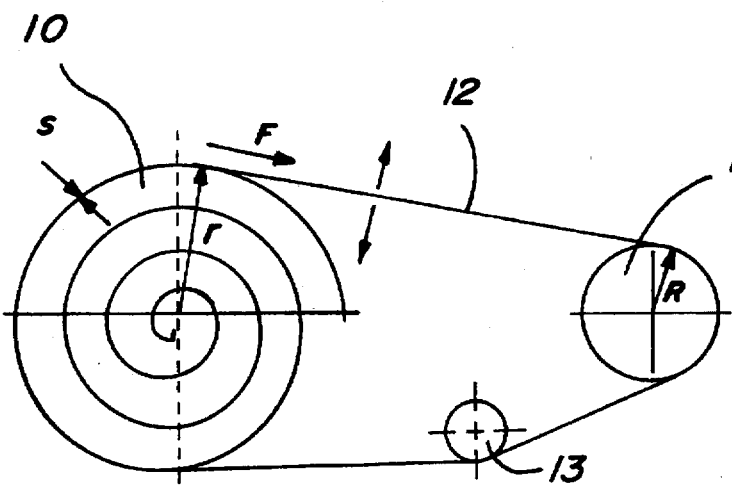
Fig-2a  Fig-2b
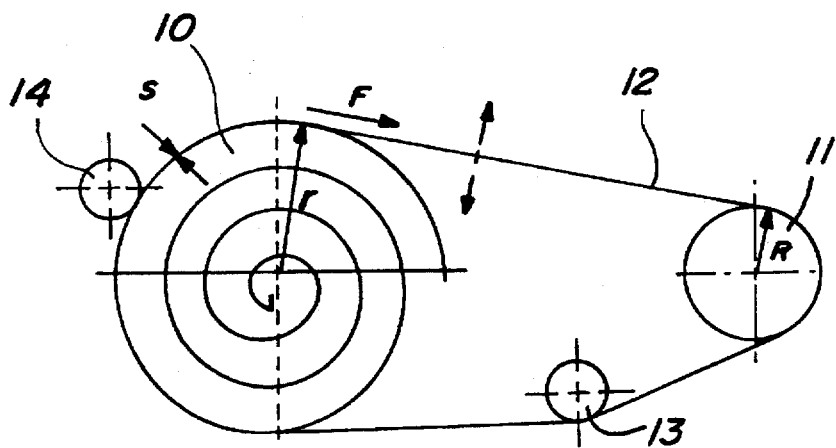
Fig-3

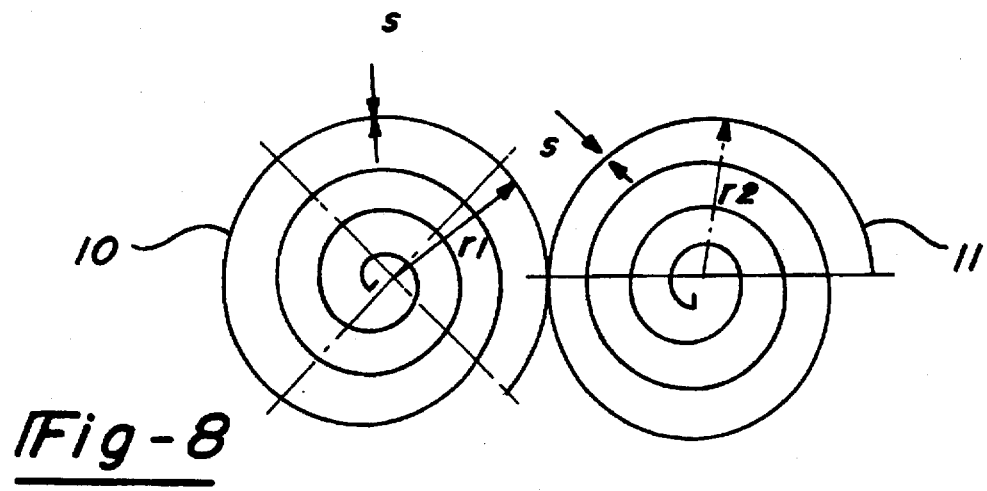
Fig-8
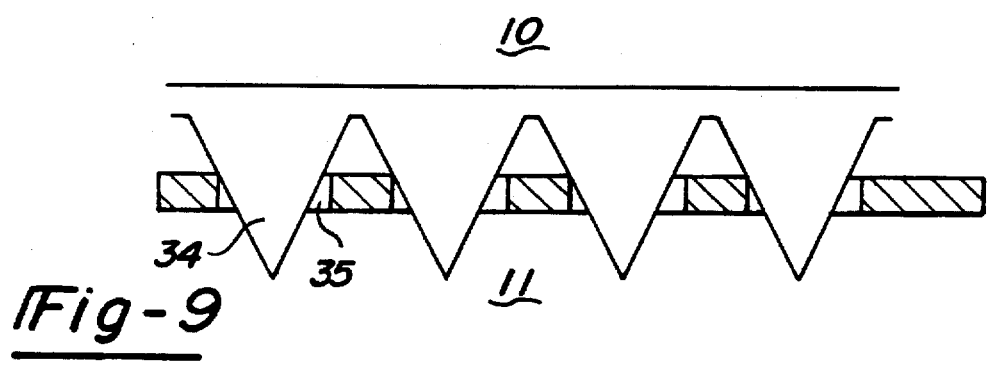
Fig-9
Fig-10
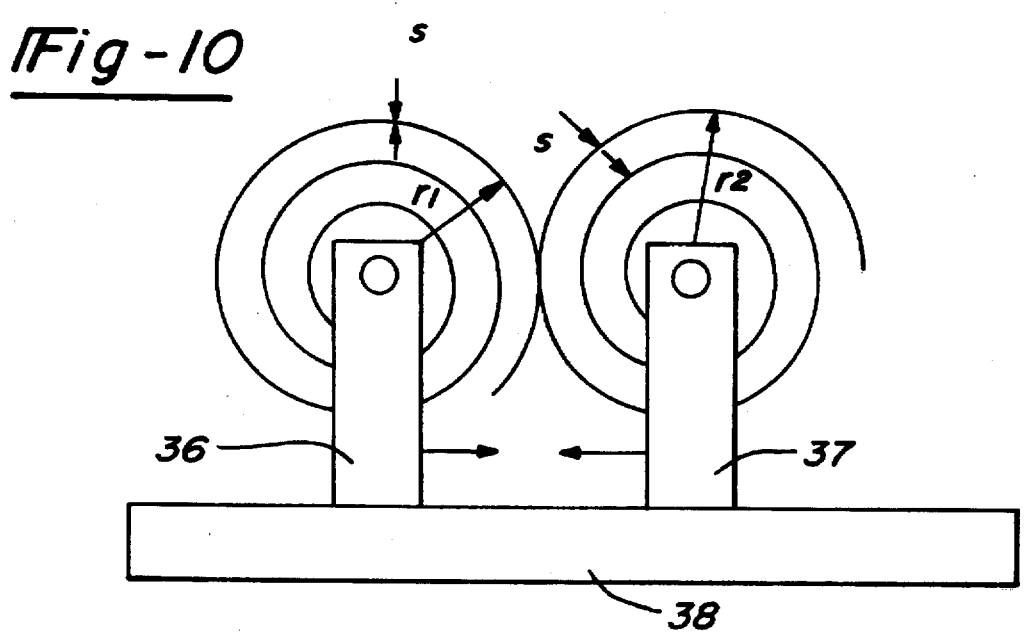

VARIABLE RATIO DRIVE MECHANISM

The present invention relates to a variable ratio drive mechanism of a type which is suitable for use in bicycles and other energy transmission systems.

A person driving a bicycle on a flat road will use a certain gear ratio for a comfortable ride. The gear ratio is fixed. The gear ratio is defined as the ratio of the diameters of the chain drive pulley 2 (at pedals) and the chain sink pulley 1 (at the rear wheel), see FIG. 1 (r/R).

The largest diameter wheel of the wheels combination with multiple diameters on the left side of the FIG. 1 is the energy input. The single diameter wheel to the right is the energy sink or load. This single diameter wheel could be a multiple diameter wheel arrangement (as illustrated on the left side). This would increase the available gear ratios. Such arrangements are well known from bicycles.

As the cyclist moves onto a slope he will deliver more torque (force exerted on the pedal multiplied by the radius of the drive pulley) to climb.

Feeling this demand for increased torque (force needed by his legs to turn the drive pulley) and probably exceeding his capacity to push, will cause the cyclist to manually change the gear ratio (if he is lucky to have a multi-level gear system on his bicycle).

Bicycles with multi-gear systems have become in the past very popular by use on mountain bikes and they are sold by the million.

An automatic, stepless gear shift device responding to the input torque would greatly simplify handling of a bicycle.

The continuous torque to gear ratio adaptation would enable matching of the energy source characteristic (torque/rpm) to the energy load characteristic. If the adaptation curve fitted well between supply and load, then the total energy available would be transferred optimally into the linear motion.

The above refers to a chain drive as found on bicycles.

The present invention also applies to other types of energy source, like gasoline or diesel engines, electric motors, water turbines, and so on. It would simplify the task of adapting the energy source to the energy load.

Automatic transmissions for automobiles have been known for a long time. However, their technical realization is complex and expensive and there are still only certain discrete levels of gear ratios available.

Hydraulic continuous torque converters are known, but their hydraulic slip is of disadvantage for continuous use due to friction and consequently lower transmission efficiency.

Usual automatic transmissions change between specific gear ratios. The gear changing procedure is automated and torque and rpm controlled. Multiple discrete gear ratios allow a better adaptation between the source and load characteristics, but it is still not a continuous optimized adaptation.

A development of an automatic and continuous gear ratio system was known in the past to be in some stage of introduction to small cars. In this arrangement a v-type belt moved radially in and out between two flanges moving axially and driving the v-belt on its side (shoulder). Flanges moving closer would squeeze the v-belt to move to a larger diameter circle and the gear ratio increases.

This development was for some time in series production, but its technical problems seem to have put it again out of the market, or at least it did not succeed in entering the market in substantial numbers.

The proposed invention presents now a reliable, inexpensive and simple mechanical solution to form a continuous ratio shifting gear system.

One aspect of the present invention provides a variable ratio drive mechanism including at least one gear whose effective radius is variable in a stepless manner.

The gear could be the pedal driven gear of a bicycle chain drive mechanism, in which case torque is applied through the pedals, or the driven gear in which case torque is applied via the chain itself.

The gear may take the form of a spiral spring, preferably wound in the direction opposite to its direction of rotation.

Alternatively, the gear may take the form of a circular rim, mounted on an axle by means of radially extending compressible members. The compressible members may comprise springs. The compressible members are compressed as they bear against the chain or belt or an engaging gear, thus varying the effective ratio of the gear. The rim may be flexible but is preferably rigid.

Alternatively, the gear may comprise a generally circular hub having arcuate members located about its circumference each having an arcuate surface positioned outside the hub circumference. Thus, the members effectively define a larger "outer" cylindrical surface. The members are positioned such that their arcuate surfaces are movable towards or away from the hub to alter the size of the "outer" surface and hence the effective radius. The arcuate surfaces of the members are preferably biassed outwardly, for example by springs.

The radius of the or each gear in the mechanism according to this invention may be arranged to be varied in response to applied torque. Alternatively or additionally, means may be provided for varying the effective radius of the gear independently of applied torque. For example, a guide roller may be provided to bear against the circumferential surface of the variable gear. The roller may be movable towards and away from the axis of rotation of the gear, to vary its effective radius.

The transmission from one gear to another may be achieved through direct engagement between gears. The transmission of motion from one gear to another may be through intermeshing teeth. Alternatively, the spiral gear may take the form of a strap having holes or recesses for receiving the teeth of a gear with which it is engaged. The other gear may also be in the form of a spiral. As noted above, torque is preferably applied to or obtained from the gear by means of a belt or chain. In a preferred embodiment of the invention, the spiral spring gear may take the form of a strap having holes therein, while the belt or chain has protrusions or teeth adapted to engage in the holes in the strap. The advantage of this arrangement is that the spiral strap with holes is relatively easy to produce when compared to a spiral strap having teeth. Moreover, teeth provided on a spiral strap would reduce the flexibility of the strap to an extent where the spiral strap may not respond adequately to increased torque, whereas in the arrangement of this preferred embodiment the strap with holes remains fully flexible.

A mechanism according to the invention preferably includes two gears, one driving and one driven, connected by a belt or chain. One or both of the gears may have a reducible radius, as described above. Thus, any combination of the gear types described above may be provided in a drive mechanism according to this invention.

Embodiments of the invention will now be described by way of example only and with reference to the accompanying drawings in which:

FIG. 1(a) is a schematic diagram of a typical bicycle chain drive system as described above;

FIG. 1(b) shows the chain drive pulley of FIG. 1(a) in side elevation;

FIG. 2(a) is a schematic diagram of a first drive mechanism according to the present invention;

FIG. 2(b) shows the chain drive pulley of FIG. 2(a) in side elevation;

FIG. 3 is a schematic diagram of a second drive mechanism according to the invention;

Figure 4A:
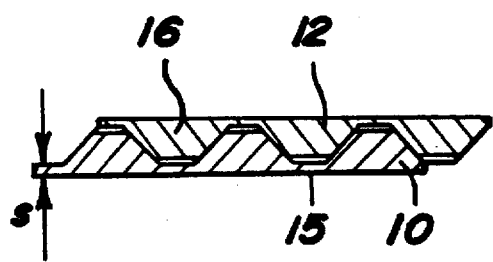
Figure 4B:
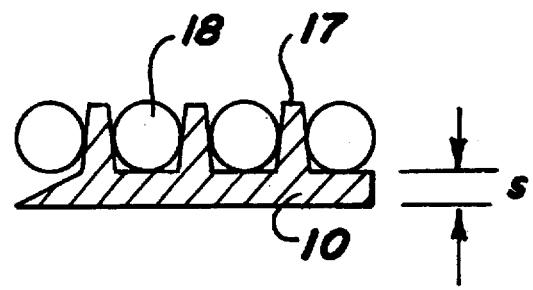
Figure 4C:
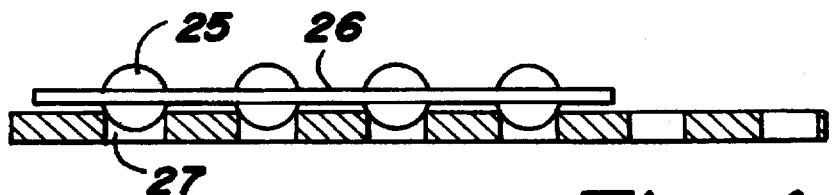
Figure 4D:
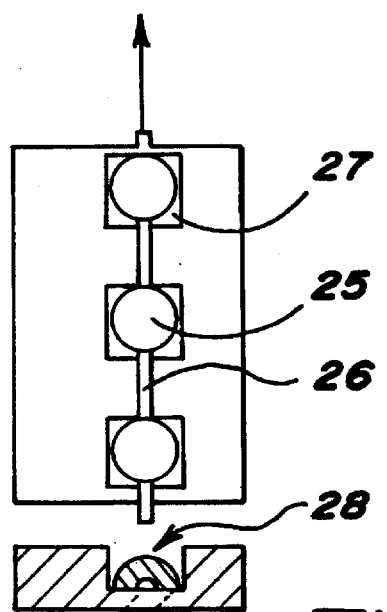
Figure 5:
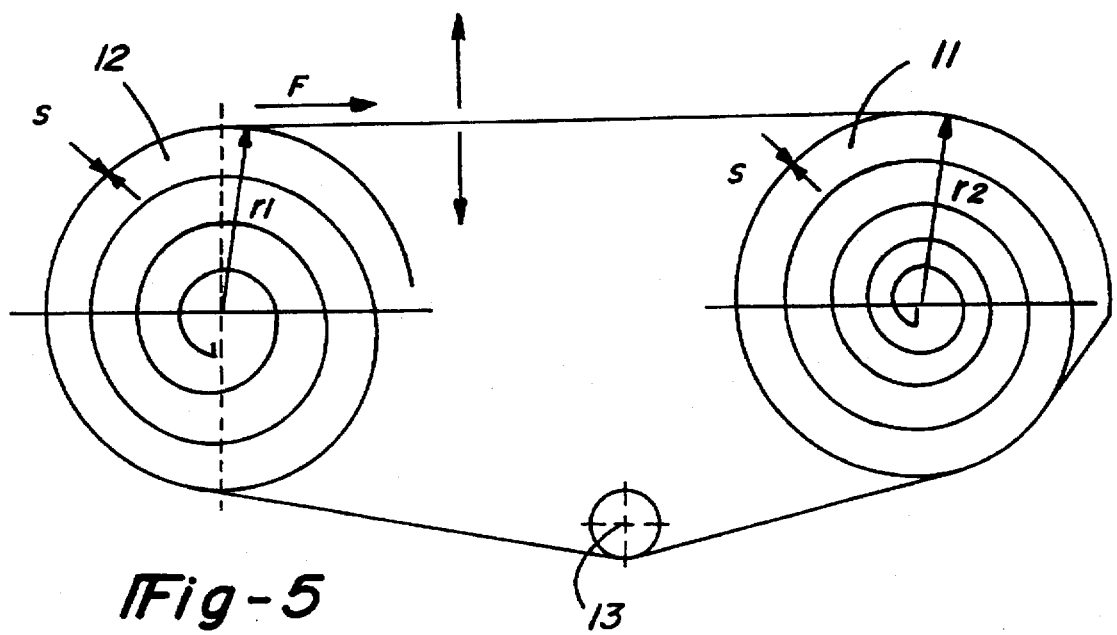
Figure 6A:
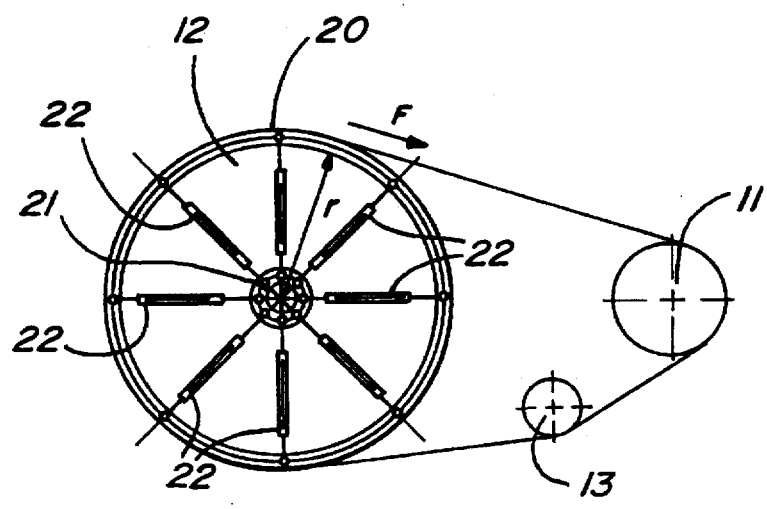
Figure 6B:
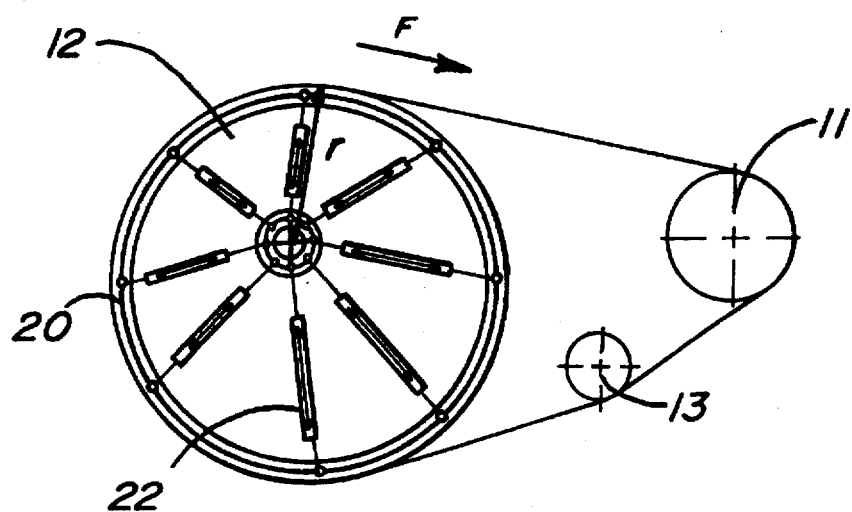
Figure 7:
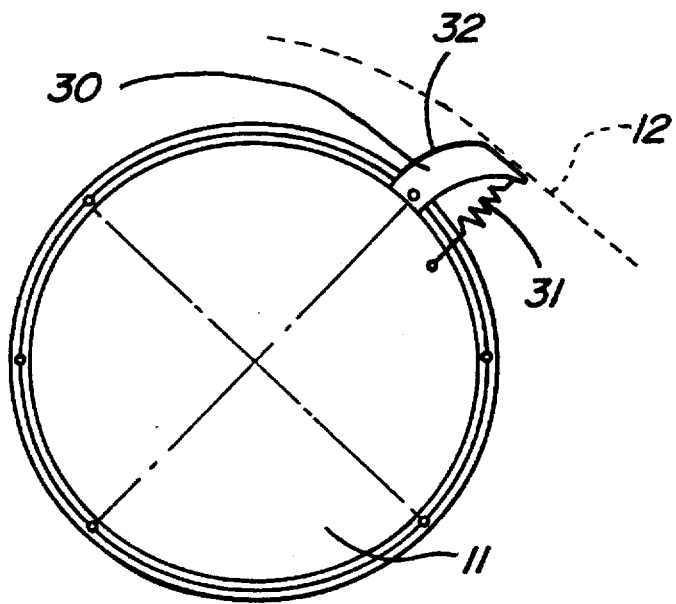

FIGS. 4(a), (b), (c) and (d) show various types of belt drive which may be used in the invention as follows:

FIG. 4(a) is a cross sectional view of a form of belt drive usable in the present invention;

FIG. 4(b) is a cross sectional view of a typical chain drive;

FIG. 4(c) is a cross sectional view of an alternative chain drive;

FIG. 4(d) shows another chain drive in plan and cross section;

FIG. 5 is a schematic diagram of a third drive mechanism according to the invention;

FIG. 6(a) is a schematic diagram of a fourth drive mechanism according to the invention, with no torque applied;

FIG. 6(b) is a schematic diagram of the mechanism of FIG. 6(a) with an applied torque;

FIG. 7 is a schematic diagram of a fifth drive mechanism according to the invention.

FIG. 8 is a schematic diagram of a sixth drive mechanism according to the invention;

FIG. 9 shows a form of gear engagement for the arrangement of FIG. 8; and

FIG. 10 is a schematic diagram of a seventh drive mechanism according to the invention.

Referring firstly to FIG. 2, there is shown a drive pulley or gear 10 and a sink or driven pulley or gear 11. Rotary motion of the drive pulley 10 is transmitted to the driven pulley 11 via a chain or belt 12 supported by a tension wheel 13. In the particular arrangement shown, the drive pulley 10 turns anti-clockwise in use to cause anticlockwise motion of the driven pulley 11. The drive pulley 10 has the form of a spiral spring which winds clockwise from its center (i.e. opposite to the direction of rotation in use). An increasing force F (because the source, e.g. cyclist, delivers more power) will cause the spiral to collapse, i.e. form more windings, and consequently the radius r will be reduced. This reduced radius r against the fixed radius R results in a changed gear ratio. the center of the spiral is fixed on an axle (not shown) at its center, which axle forms the power input into the spiral shaped drive pulley. In the arrangement of FIG. 2 the diameter of the drive pulley 10 is variable and the diameter of the load pulley 11 is fixed.

In the case of application of the arrangement of FIG. 2 to a bicycle, the radius r will vary constantly and continuously (steplessly) along with the torque supplied via the pedals by the cyclist.

The arrangement shown in FIG. 3 is identical to the arrangement shown in FIG. 2 except that it includes an additional guide roller 14 shown bearing against the outer surface of the drive gear 10. The guide roller is so arranged that it can be moved manually towards or away from the center of the drive gear 10. For example, it may be rotatably and slidably mounted on a support arm extending radially from the center of the spiral, the arm being arranged to be stationary as the gear 10 rotates.

With no applied torque (no pulling force F) the position of the guide roller 14 defines the radius of the drive gear 10. The spiral radius can shrink or extend depending on the position of the guide roller 14. When torque is applied to the mechanism the force of the spiral against the guide roller will reduce as the torque increases and at a certain force level the spiral will disengage from the guide roller 14 and from there on the automatic stepless adjustment of transmission ratio will operate as described above with reference to FIG. 2. The position of the guide roller limits the maximum transmission ratio (r/R). Manually moving the guiding roller towards the center of the spiral will "override" the stepless gear ratio defined by the torque or pulling force F. Thus, in the case of a cycle transmission, the cyclist can select an even lower gear ratio than that provided by the automatic mechanism. The cyclist has more control over the selection of gear ratio.

It will now be appreciated that with suitable choice of the resilience of the spring and other components of the system, the stepless variation of gear ratio can be achieved entirely manually, independently of applied torque.

Alternatively, in another application, the gear ratio selection could be defined by parameters delivered from an engine control for example. For example, in a motor car, the appropriate gear could be selected automatically based on factors such as minimisation of exhaust gas, combustion characteristics and current conditions such as temperature and altitude.

In the arrangement of FIGS. 2 and 3, the outer surface of the spiral drive pulley 10 and/or driven pulley 11 could be provided with grooves 15 to engage with corresponding protrusions 16 provided on the belt 12, as shown in FIG. 4(a). Alternatively, the outer surfaces of the pulleys 10 and/or 11 could carry teeth 17 for engaging between the links 18 of a chain forming the drive belt, as shown in FIG. 4(b). However, the provision of protrusions or teeth on a spiral pulley may significantly reduce the flexibility and, therefore, the effectiveness of the pulley in responding to changes of torque. Alternatively the facing surfaces of the pulleys 10 and the drive belt 12 could simply be roughened to provide a pure friction drive. In a further alternative, the "chain" could carry teeth or could comprise a row of steel balls 25 joined by a steel cord or wire 26 or other strong flexible material, as shown in FIG. 4(c). The circumferential surfaces of the or each pulley 10, 11 could be provided with holes 27 for receiving the teeth or the balls 25. For example, the spiral 10 could be in the form of a steel strap provided with the holes 27 for cooperating with the protrusions on the chain provided by the balls 25. FIG. 4(d) shows a slightly more refined version in which a groove 28 is provided to receive the cord 26 as well as holes 27 for receiving the balls. The spiral strap with holes 27 is relatively easy to manufacture and retains full or increased flexibility when compared to a strap without holes.

As shown in FIG. 5, both the load pulley 11 and the drive pulley 10 could be in the form of spiral springs so as to increase the available range of gear ratios (r1/r2). Both spirals could be provided with an adjustable guide roller as shown in FIG. 3.

The change of radius r with respect to force F can be made linear or non-linear, to fit the energy supply characteristic. The non-linear behaviour can easily be created by varying the thickness S of the spiral along its length.

The spiral design of FIGS. 2 and 4 is a very economical design and could be very useful for bicycle gear applications. Other drive mechanisms according to the invention will now be described with reference to FIGS. 6 to 10.

In the example of FIG. 6 the drive pulley 12 has a circular rim 20 connected to a central hub or axle 21 via a series of springs 22 acting as spokes for supporting the rim 20. The springs 22 may be compressed to shorten their length. The arrangement is such that without any applied force as shown in FIG. 6a the rim 20 is concentric with the axle 21. An increasing force F causes the springs to be compressed causing the rim 20 to collapse inwardly reducing the effective radius of the pulley and hence the effective gear ratio. The developing force F resulting from input torque brings the balance of the springs out of center thus reducing the torque defining radius r (which extends from the axis to the pulling point of the belt or chain). The rim 20 may be relatively flexible but it is preferably stiff so that it retains its circular shape.

FIG. 6b shows the configuration with torque applied. The stiff rim 20 appears to float with respect to the axis of rotation. Some of the springs 22 are compressed to reduce the effective radius while others are caused to be stretched. Again a guide roller may be introduced for manual variation of the drive ratio as with the example of FIG. 3, whether the rim 20 is stiff or flexible.

FIG. 7 shows a further alternative arrangement in which the drive pulley 11 is provided with a series of arcuate members 30 about its circumference. Only one member 30 is shown but several would be provided in practice, evenly spaced around the pulley. Each member 30 is pivotably attached to the pulley near to its outer surface at a point adjacent one end of the arcuate surface 32 of each member 30. The arcuate members are biassed radially outwardly by means of springs 31 extending from a point near the other end of the arcuate surface 32 to a point on the pulley 12 spaced from the pivot point. As with the previously described arrangements, the greater the force F, the more the springs 31 are compressed to reduce the effective radius of the pulley and hence the effective gear ratio.

FIG. 8 shows an alternative embodiment of the invention in which a drive gear 10 and driven gear 11 both have the form of spiral springs and are directly engaged so that motion is transmitted from one to the other in the same way as intermeshing toothed gears. Thus, no belt or chain is needed. A suitable surface design is provided to ensure that the rims of the two gears would not slip against each other under applied torque. FIG. 9 shows one possible example in which drive pulley 10 has protruding pointed teeth 34 and pulley 11 is in the form of a spiral strap having holes 35. The arrangement shown in FIG. 4(a) would also be suitable for this embodiment of the invention.

In a "beltless" arrangement the spirals should be arranged to press against each other at all times even under applied torque which tends to decrease their radii. In the arrangement of FIG. 10, the gears are mounted on respective arms 36, 37 which are slidably mounted on a support frame 38 and biassed together by means not shown. In the arrangement of FIGS. 8 to 10, the gear ratio could be altered automatically in response to applied torque or by some other applied force such as through one or more guide rollers as shown in FIG. 3.

It will be appreciated that one or both of the two spiral gears shown in FIG. 10 could be replaced by other types of gear described above, especially those shown in FIGS. 6(a) and 6(b). The rims of the FIG. 6 type gears would probably need some means to prevent them from disengaging, possibly by some complementary construction or by means of teeth and holes as shown in FIG. 9.

The various spiral gears shown in the above arrangements are shown in exaggerated form for the sake of clarity. In practice, the ends of the spirals would bend smoothly towards the next inner spiral turn to avoid a "step" in the outer surface. By proper shaping, the last turn of each spring could be made to bend more easily to the next inner spiral level to avoid the effect of a "step". This effect might be assisted by varying the thickness of the material in the last turn.

I claim:

1. A variable ratio drive mechanism including at least one gear in the form of a spiral spring whose effective radius is variable in a stepless manner, wherein torque is applied to or obtained from the gear by means of a belt or chain, the belt or chain having protrusions thereon, and the spiral spring is in the form of a strap having recesses therein arranged to cooperate with said protrusions.

2. A variable ratio drive mechanism as claimed in claim 1 in which the spring is wound in the direction opposite to its direction of rotation in use.

3. A variable ratio drive mechanism as claimed in claim 1 including means for varying the effective radius of the gear independently of applied torque.

4. A variable ratio drive mechanism as claimed in claim 3, in which the radius varying means comprise a guide roller bearing against the circumferential surface of the gear.

5. A variable ratio drive mechanism as claimed in claim 4, in which the guide roller is movable with respect to the axis of rotation of the gear.

6. A variable ratio drive mechanism as claimed in claim 1 in which the radius of the gear is arranged to vary in response to applied torque.

7. A variable ratio drive mechanism as claimed in claim 1, in which the belt or chain connects the gear to a further gear.

8. A variable ratio drive mechanism according to claim 7, in which the effective radius of the further gear is variable in a stepless manner.

9. A variable ratio drive mechanism including at least one gear having the form of a stiff circular rim mounted on an axle by means of radially extending compressible members, whereby the effective radius of the gear is variable in a stepless manner.

10. A variable ratio drive mechanism as claimed in claim 9 in which the compressible members comprise springs.

11. A variable ratio drive mechanism as claimed in claim 9, in which the radius of the gear is arranged to vary in response to applied torque.

12. A variable ratio drive mechanism as claimed in claim 9 in which the gear engages another gear.

13. A variable ratio drive mechanism as claimed in claim 12 in which the other gear has the same form as the first mentioned gear.

14. A variable ratio drive mechanism as claimed in claim 4 in which torque is applied to or obtained from the gear by means of a belt or chain.

15. A variable ratio drive mechanism as claimed in claim 14 in which the belt or chain connects the gear to a further gear.

16. A variable ratio drive mechanism according to claim 15 in which the effective radius of the further gear is variable in a stepless manner.

17. A variable ratio drive mechanism as claimed in claim 9, including means for varying the effective radius of the gear independently of applied torque.

18. A variable ratio drive mechanism as claimed in claim 17, in which the radius varying means comprise a guide roller bearing against the circumferential surface of the gear.

19. A variable ratio drive mechanism as claimed in claim 18, in which the guide roller is movable with respect to the axis of the rotation of the gear.

* * * * *